United States Patent
Kochanneck

[19]

[11] Patent Number: 5,850,762
[45] Date of Patent: Dec. 22, 1998

[54] MULTI-BLOCK ROBOT

[76] Inventor: Uwe Kochanneck, Im Spahenfelde 25, D-44145 Dortmund, Germany

[21] Appl. No.: 645,423

[22] Filed: May 13, 1996

[30] Foreign Application Priority Data

May 16, 1995 [DE] Germany .................. 195 17 852.1

[51] Int. Cl.$^6$ .............. B25J 17/00; B25J 18/00; B60K 1/00

[52] U.S. Cl. .................. 74/490.03; 74/490.05; 74/606 R; 180/65.1; 318/568.11; 318/568.12; 901/28

[58] Field of Search .............. 74/490.03, 490.05, 74/606 R; 180/65.1, 65.6, 65.7, 65.8; 318/568.11, 568.12; 414/729; 446/91, 484; 901/28

[56] References Cited

U.S. PATENT DOCUMENTS

| | | | |
|---|---|---|---|
| 4,370,091 | 1/1983 | Gagliardi | 414/735 |
| 4,697,472 | 10/1987 | Hiyane | 403/12 X |
| 4,766,775 | 8/1988 | Hodge | 403/13 X |
| 5,241,875 | 9/1993 | Kochanneck | 74/490.03 |

Primary Examiner—Allan D. Herrmann

[57] ABSTRACT

A robot system with robot specific effects comprising multi-blocks of nearly the same design, each surrounded with one closed chamber for the accommodation of driving units, basic gears, generator units, basic control electronic for basic units and integrated built-in equipment for overall robot control, combined with multiblocks composed of central chambers and thereof separated socket flange booster chambers. The central chambers, accomodating driving units, basic gears, generator units and basic control electronic for the basic units. The socket flange booster chambers, having nearly the same contour as the central chambers and integrate built-in equipment for overall robot control. The central chambers and the socket booster chambers, connecting the current and communication links between the central chambers and the socket flange booster chambers during the operation for plug in connection of the central chambers with the socket flange booster chambers. The socket booster chambers plug connected without central chambers and composing multiblock stand-alone pc's, battery units, solar cell units, antenna units, gear units, machining tools, gripper tools, electro cars and further multiblock robot compatible socket booster chambers.

5 Claims, 9 Drawing Sheets

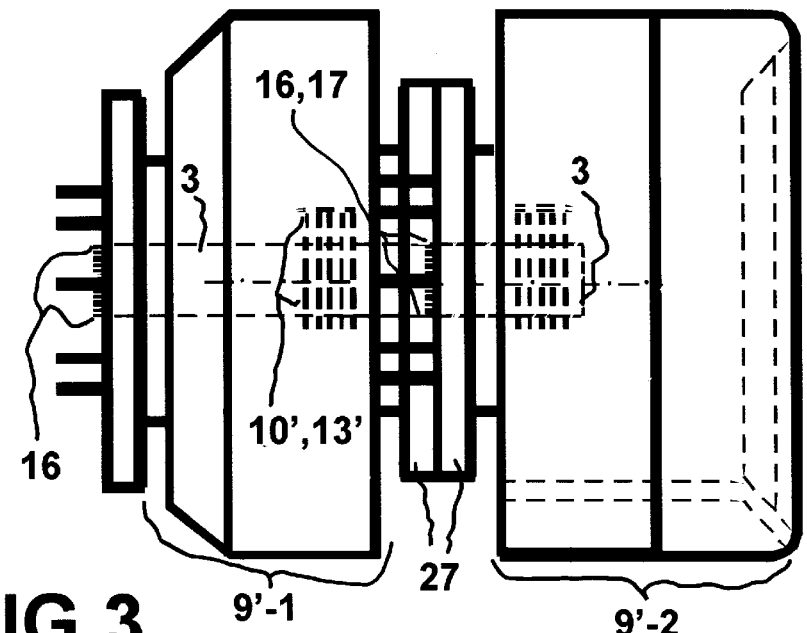
FIG.3
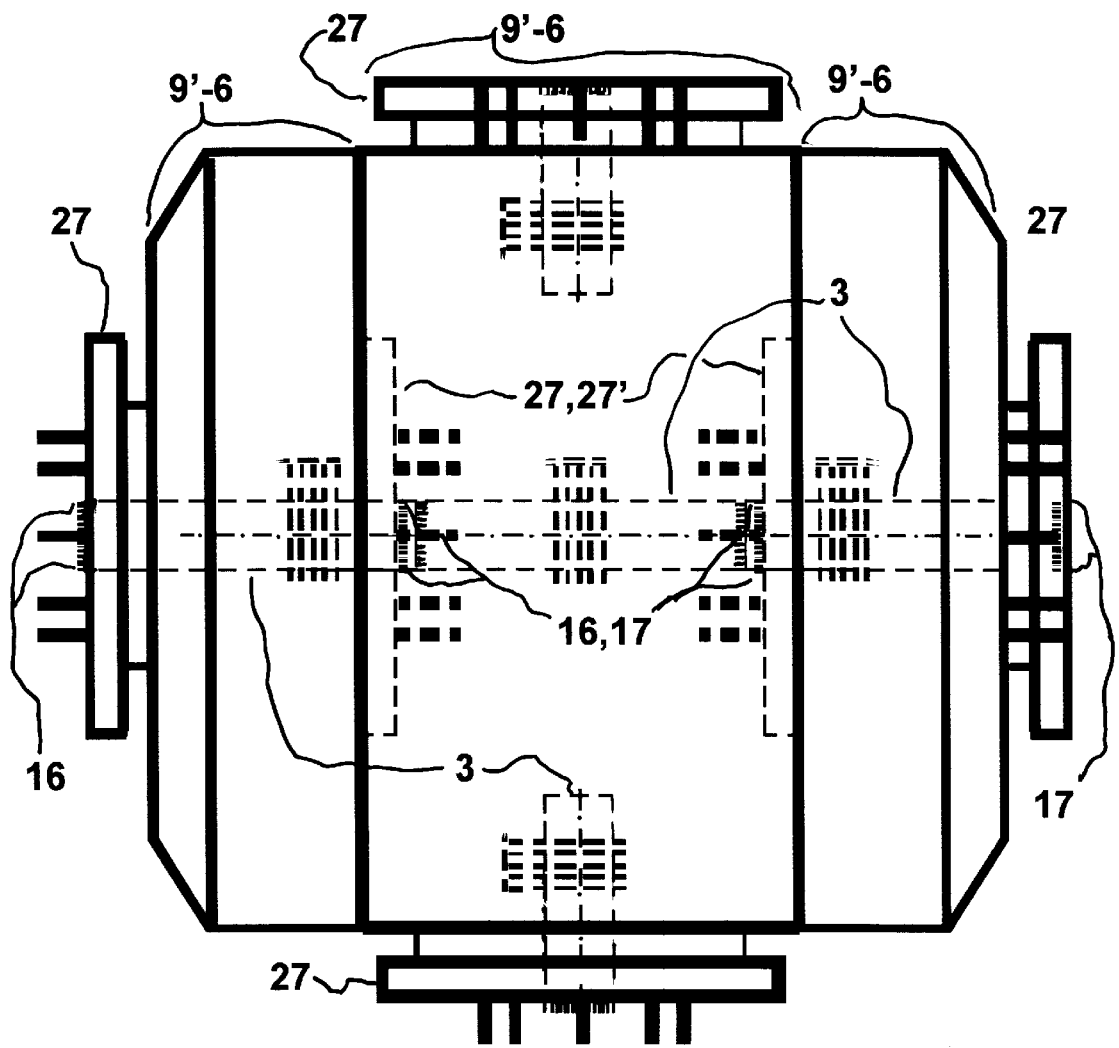

MULTI-BLOCK ROBOT

BACKGROUND OF THE INVENTION

This application relates to a robot system with robot specific effects. A robot system is known which comprises robots with self operating walk, drive and manipulating faculties, which can be reconstructed with few manipulations for other fields of user activities composed of various multiblocks of nearly the same design, with rotation-flange plug connections and block chambers having inside equipment components as accumulators, sensor elements, computer boards for control of total multiblock robots. Another robot system is known which increases the operative and flexibiltiy advantages for users of such a multi-axis robot system by means of small sized, more compact, lightweight multiblocks, having center-axis driving units with generator properties.

However, for some fields of these robot applications, the achieved degree of standardisation proved to be insufficient for economical operations.

SUMMARY OF THE INVENTION

It is an object of the present invention to increase further the advantages of economical manufacturing, functionality, the spectrum of operations and the application flexibility of these multi-axis robot systems by means of an even more stringent standardisation.

These objects are attained according to the present invention, comprising multiblocks of nearly the same design, each surrounded with one closed chamber for the accommodation of driving units, basic gears, generator units, basic control electronic for basic units and integrated built-in equipment for overall robot control, combined with multiblocks composed of central chambers and thereof separated socket flange booster chambers. The central chambers, accomodating driving units, basic gears, generator units and basic control electronic for the basic units. The socket flange booster chambers, having nearly the same contour as the central chambers and integrate built-in equipment for overall robot control. The central chambers and the socket booster chambers, connecting the current and communication links between the central chambers and the socket flange booster chambers during the operation for plug in connection of the central chambers with the socket flange booster chambers.

This arrangement is a considarable improvement over the prior-art systems, that by means of a further division of multiblocks in standardised subparts, the variety, functionality and economical manufacturing of multiblock robots and other multi-axis systems is furthermore improved. At choise, the heat absorbation can be positively influenced and furthermore, the integration of built-in equipment is simplified, and the multiblock robot system compatible, fully operable external use of these multiblock robot built-in equipments is possible, which consequently increases the field of application possiblities of the multiblocks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a front view with a partial sectional view along the center line of a multiblock robots medium part and of the upper part, having two multiblocks with two horizontal and vertical rotation-flange plug connections before the plug in operation, which is carried out in arrow direction on each of the rotation-flange connections, arranged in opposite position to each other, and which in head position provides vertically a socket flange booster chamber whereas in horizontal direction, further socket flange booster chambers are plugged in;

FIG. 3 is a side view of the combination shown in FIG. 2 on an enlarged scale with plugged in socket flange booster chambers, without the central chambers and the socket flange booster chambers in head position;

DESCRIPTION OF THE PREFERRED EMBODIMENTS

Figure 1:
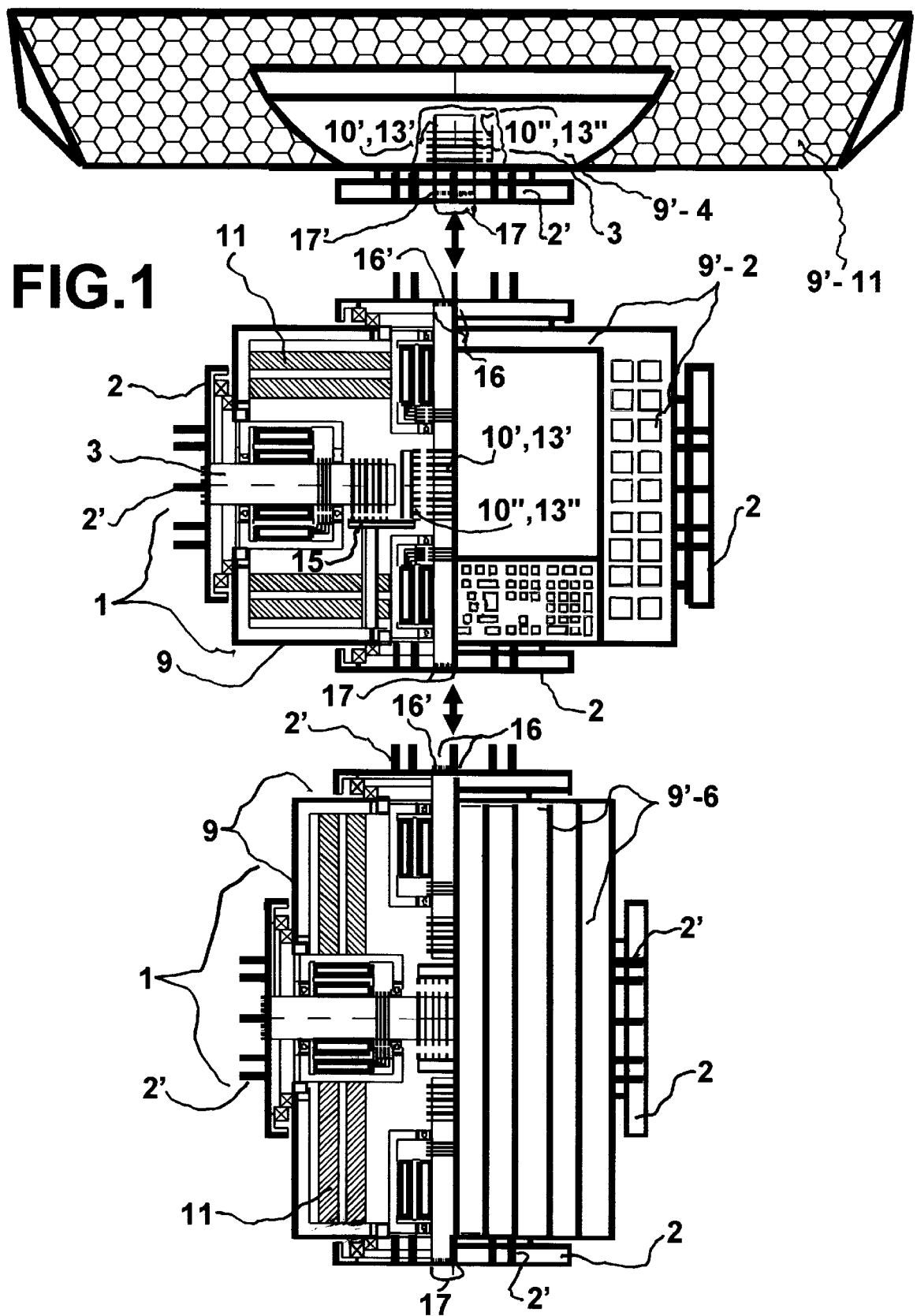
Figure 2:
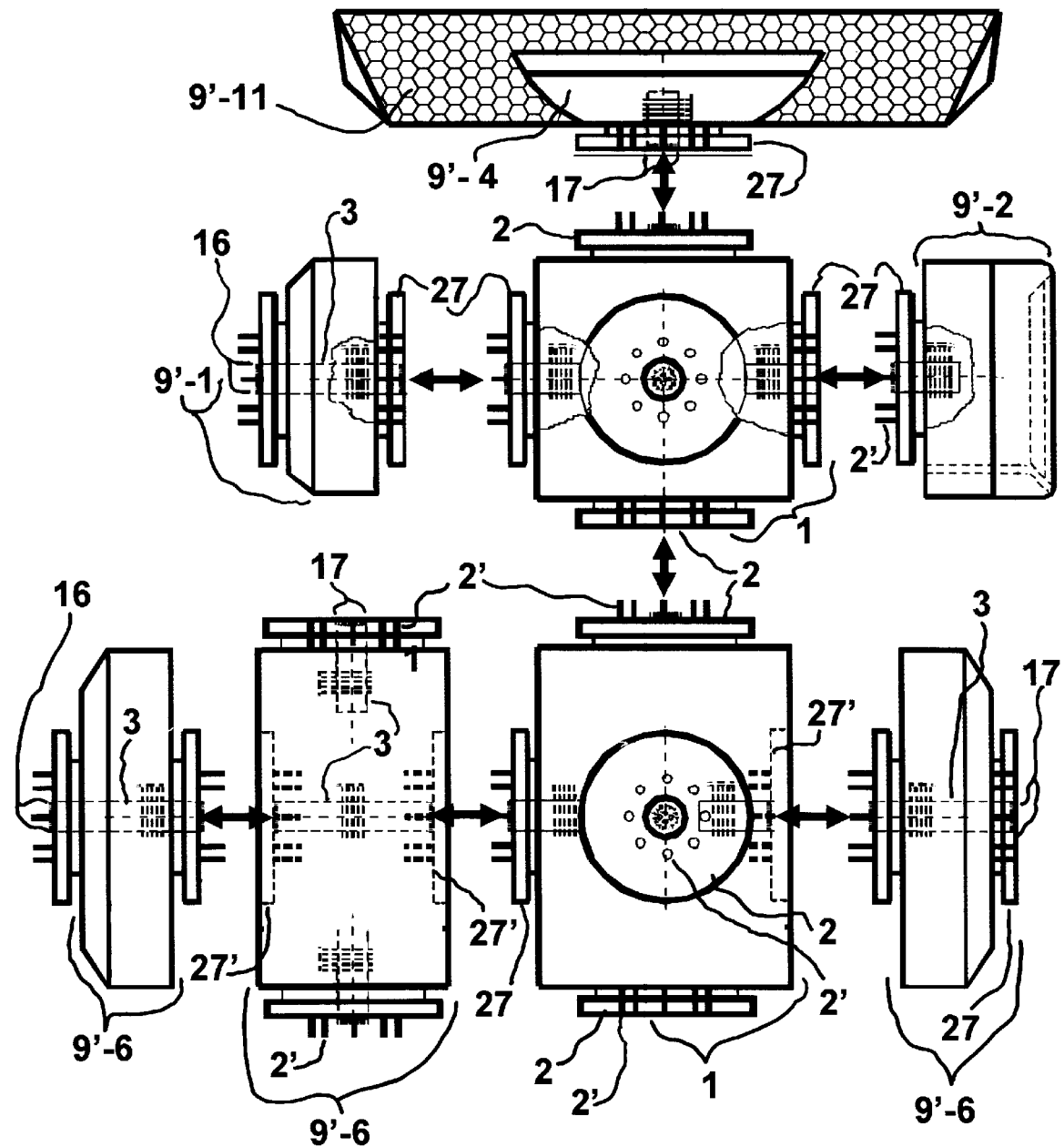
FIG. 2 is a side view of the combination shown in FIG. 1 on a reduced scale, with fractional lines defining within the parts, the provided current and communication channels and the inner and outerslip-ring and induction units.

Referring to FIGS. 1 and 2 of the drawings, the upper multiblock 1 is defined as a computer unit with remote control means, for the central control of a multiblock robot and the lower multiblock 1 is defined as a power supply unit for the power supply by means of batteries, for an autonomous, self operating function. Both multiblocks 1 are provided with an identical central chamber 9 but with another, 90° different, rotational position to each other, for the plug in operation. The central chambers 9 are provided with horizontal and vertical rotation flange plug connections 2, with plug-units 16 and plug contacts 16 and the plug sleeve units 17 with the plug sleeves 17', furthermore the current and communication channels 3 and the inner and outer current, power and supply lines, as also the inner and outer slip-ring and induction units 10',10",13'13", the slip-ring and induction support unit 15, as well as the belonging driving and basic gears and, if necessary having generator units. In addition to the rotation flange plug connections 2 are provided front and rearwarded socket flanges 27,27' which are not driven and are provided with, and also without ball bearings, but which are otherwise identical with the rotation flange plug connections 2 with plug-units 16 and plug contacts 16 and plug contacts 16" and the plug sleeve units 17 with the plug sleeves 17', the current and communication channels 3 and the inner and outer current, power and supply lines, as also having the inner and outer slip-ring and induction units 10',10",13'13", and the slip-ring and induction support unit 15. There is a free option for the equipment of a central chamber 9 with one of the socket flanges 27,27' and the corresponding positioning. For most applications however, the arrangement is analogous to the arrangement of the rotation flange plug connections 2, so that at the front wall of a central chamber 9 is provided a plug-unit 16 and at the rear wall a plug sleeve unit 17, both positioned in opposite direction to each other. The socket flanges 27 have the same flange depth as have the flanges for the rotation flange plug connections 2 of the central chambers 9. The contour of the socket flanges 27' is shaped as a reversed image of the socket flanges 27, so that the socket flanges 27 have a dimension-fitting seat to each other and the seat face of the socket flanges 27 fits precisely and tight into the plug in cavity of the socket flanges 27'. In the present case, the socket flanges 27' are located within the central chambers 9, in depth equivalent to the depth of the socket flanges 27. The socket flange booster chambers are optionally shaped, independently from the contour of the central chambers 9. However, for most cases of applications there is provided an identical and adapted design, equivalent to the outer contour and the design of the central chambers 9. In accordance with the user intentions, they receive socket flanges 27, 27' precisely identical with the socket flanges 27,27' of the central chambers 9, with the multiblock robot clamping devices with plug-units 16 and plug contacts 16 and the plug sleeve units 17 with the plug sleeves 17', the current and communication channels 3 and the inner and outer current, power and supply lines, as also with the inner and outer slip-ring and induction units 10',10",13'13", and the slip-ring and induction support unit 15.

At this point of the description, it will be helpful to clarify that the reference characters for the socket flange booster chambers of the specific embodiments from FIG. 1 to FIG. 9 are identified by the reference characters from 9'-1 to 9'-14, in accordance with the assigned task. They receive only one socket flange 27 or several, at both sides, analogous and identical to the arrangement as for the socket flanges 27,27' of the central chambers 9, so that at both sides, at the front of a socket flange booster chamber 9'-1 to 9'-14, in opposite direction to each other, is located a plug-unit 16 and at the rear, a plug sleeve unit 17. Generally, all multiblock robot socket flange booster chambers are multi-axis operational units, receiving an optional built-in equipment 11, as batteries, solar cells, sensors, monitors, computer cpu-units, photo cells, infrared sensors, remote control antennas and other orientation components for multi-axis operations, and they are shaped in the outer contour in correspodance to the outer contour of the built-in equipment 11 which has to be included. At the front contour of the upper multiblock 1, is located and flange connected a socket flange booster chamber 9'-2 with built-in equipment 11 for a computer monitor with the screen assembly, the control keys, an additional retractable key-board, a diskette input unit, and at the rear contour is located a socket flange booster chamber 9'-1 (shown in FIG. 3), with the size of a stand-alone desktop computer without monitor, with built-in equipment composed of a computer unit with the necessary peripherals, as with disk units. With the always identical design of all socket flanges 27,27' and the flanges of all rotation flange plug connections 2, there is a plug connection possibility of the socket flange booster chambers 9'-1 to 9'-14 with free socket flanges 2,27', as also with every free flange of the rotation flange plug connections 2. In the present case, the socket flange booster chamber 9'-2,9'-1 is freely rotatable by means of the driving units of the rotation flange plug connections 2 within the central chamber 9, this in accordance with the multi-axis driving principle for multiblocks 1. Consequently, serves the free flange of the rotation flange plug connection 2 in head position of the upper multiblock 1, for the plug connection with the antenna unit 9'-4 above it, consisting of the antenna unit with transmitter and receiver electronic and remote control components, which therefore is freely rotatable by means of the driving unit of the rotation flange plug connection 2 of this multiblock 1. The outer contour of the socket flange booster chamber 9'-4 receives the socket flange booster chamber 9'-11 with solar cells and the corresponding built-in equipment 11, consisting of solar collector electronic and of the antenna unit with transmitter and receiver electronic and remote control components. The central chamber 9 of the lower multiblock 1 receives in front position a socket flange booster chamber 9'-6 with built-in equipment 11 in accordance with the user intentions, here consisting of battery cells. At the rear of the central chamber 9 is plug connected a further socket flange booster chamber 9'-6 with built-in equipment 11 consisting of battery cells, which in horizontal direction receive at both sides a socket flange 27' and in vertical direction at both sides, a socket flange 27. This multiblock 1 is closed by means of a further socket flange booster chamber 9'-6 with built-in equipment consisting of battery cells. In the plug connected state and the connection of two socket flanges 27, the socket flange booster chambers 9'-1 to 9'-14 are separated from the central chambers by an air gap of twice the depth of the two socket flanges 27. This enables a good heat discharge for the central chamber 9 and for the socket flange booster chambers, because of the separation by the air gap.

If a socket flange 27 is plug connected with a socket flange 27', the central chamber 9 and the socket flange booster chambers are located one directly above the other without an air gap between. This plug connection is prefered if the heat discharge of the multiblock 1 has no priority in comparison with reduced overall dimensions. In general, the combination possibility of multiblock robot socket flange booster chambers with each other and with, or without the connection with central chambers 9, is not limited, because of nearly the same design for these parts and by the identical design of the socket flanges 27,27' and of the flanges for the rotation flange plug connections 2. At the same time, the current and communication transmission between the combined parts and the built-in equipment 11 is always maintained by the identical design per socket flange 27,27' and rotation flange plug connection 2 with identical current and communication channels 3, multiblock robot clamping devices, plug-units 16 and plug contacts 16, plug sleeve units 17, plug sleeves 17', as also with the inner and outer slip-ring and induction units 10',10",13'13", and the slip-ring and induction support unit 15.

Referring to FIG. 3 of the drawings, the upper two socket flange booster chambers 9'-1 and 9'-2 are plug connected to an independent, stand-alone computer unit without the upper central chamber 9. The socket flanges 27 separate the monitor unit from the computer unit, thus providing the air gap between these units. The lower three socket flange booster chambers 9'-6 are plug connected without the lower central chamber 9 to an independent, stand-alone battery unit. Here, the socket flanges 27' with its cavity provide a direct plug connection, without an air gap between the plug connected socket flange booster chambers 9'-6. Subsequently, dependent on the heat development of the built-in equipment 11, the both upper socket flange booster chambers 9'-1 and 9'-2 can be plug connected side by side with the socket flanges 27,27' without an air gap between, and the lower three socket flange booster chambers 9'-6 can be plug connected with socket flanges 27, providing an air gap between each of the socket flange booster chambers. The current and communication channels 3 include at he upperst flange section of the rotation flange plug connection 2 and of the socket flanges 27,27', the plug-units 16 and the plug sleeve units 17 with plug sleeves 17'. Therefore, they are end plugs and end sleeves for the current, power and communication lines. Thus, it is possible to connect free socket flanges 27,27' and also free flanges of the rotation flange plug connections 2 by means of power cables with the public line circuit, for battery cell charge operations, for the direct power supply of stand-alone computer units within the socket flange booster chambers of optional multiblocks 1, or of total multiblock robot systems with the public mains.

Figure 4:
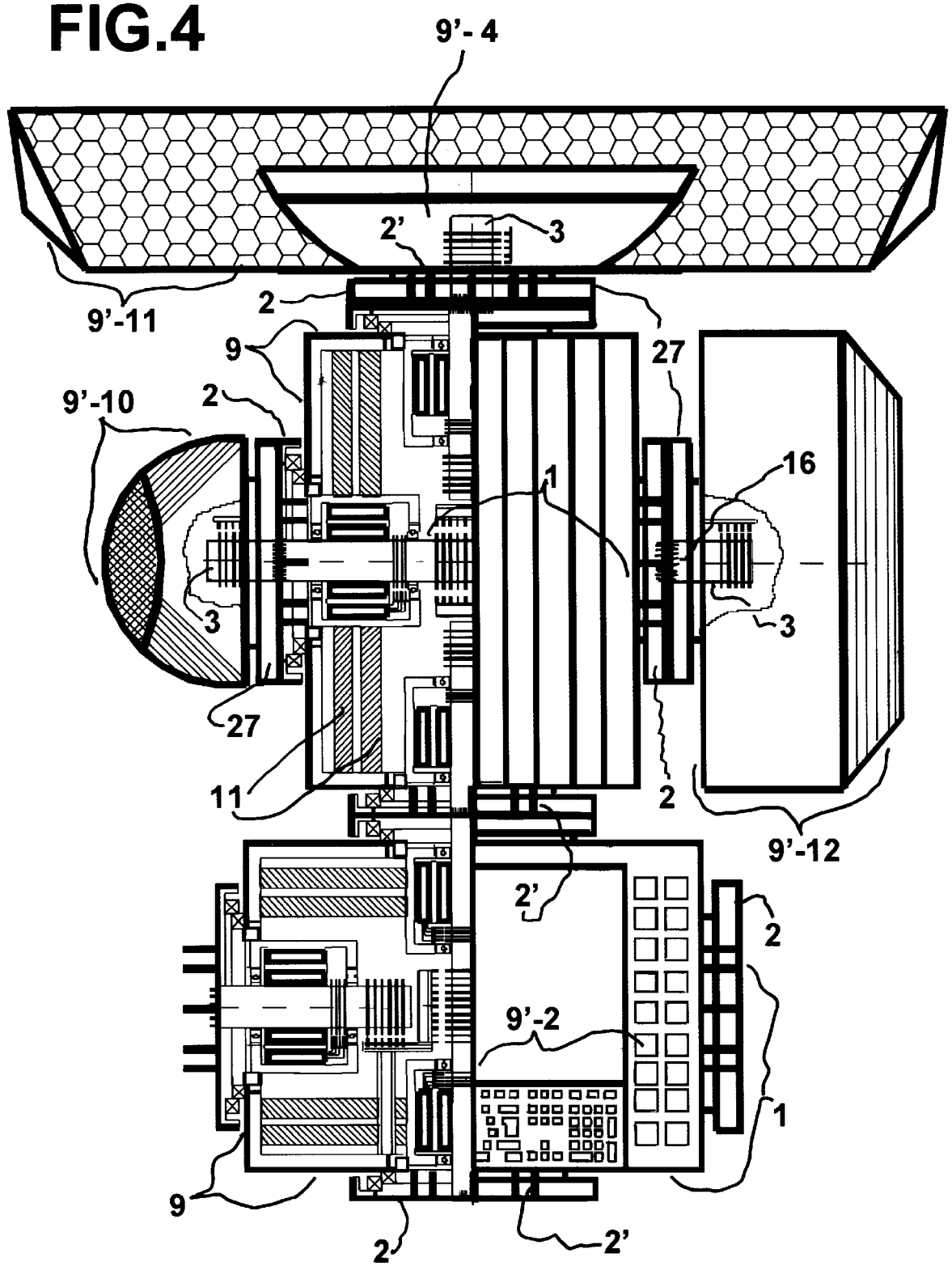
FIG. 4 is a front view of a multiblock-robot upper part and partially shown in a sectional view along the center line, of two multiblocks with socket flange booster chambers in head position.

Referring to FIG. 4 of the drawings, the central chamber 9 located in lower position includes at the front and at the rear one horizontal socket flange 27. Also here, the front socket flange 27 receives a socket flange booster chamber 9'-2 with integrated built-in equipment 11, consisting of a monitor unit and at the rear socket flange 27 a socket flange booster chamber 9'-1 with integrated built-in equipment 11, consisting of a computer cpu-unit with the necessary peripherals. The upper horizontal rotation flange plug connection 3 is also here plug connected with a multiblock 1 which has an identical central chamber 9 with a 90° different rotational position, but this central chamber receives no socket flanges 27. This multiblock 1 composes the head unit of a multiblock robot. The necessary socket flange booster chambers 9'-10 and 9'-12 with integrated built-in equipment 11 are here plug connected by means of the both horizontal rotation flange plug connection 2 and the one in vertical, upper position. The socket flange booster chamber 9'-10 on the left composes an image recognition unit and receives built-in equipment 11 which includes image recognition sensor electronic as photo cells and infrared sensors. The socket flange booster chambers 9'-12 on the right composes a speech recognition and speech reproducing unit and receives the necessary electronic parts. The socket flange booster chambers 9'-4 and 9'-11 which are located in upper vertical position are here again provided as an antenna unit 9'-4 with transmission and receiver electronic and remote control components, and as a solar-cell unit 9'-11. Both units are identical with the equipment for the antenna unit 9'-4 and the solar-cell unit 9'-11 of FIG. 1 and FIG. 2.

Figure 5:
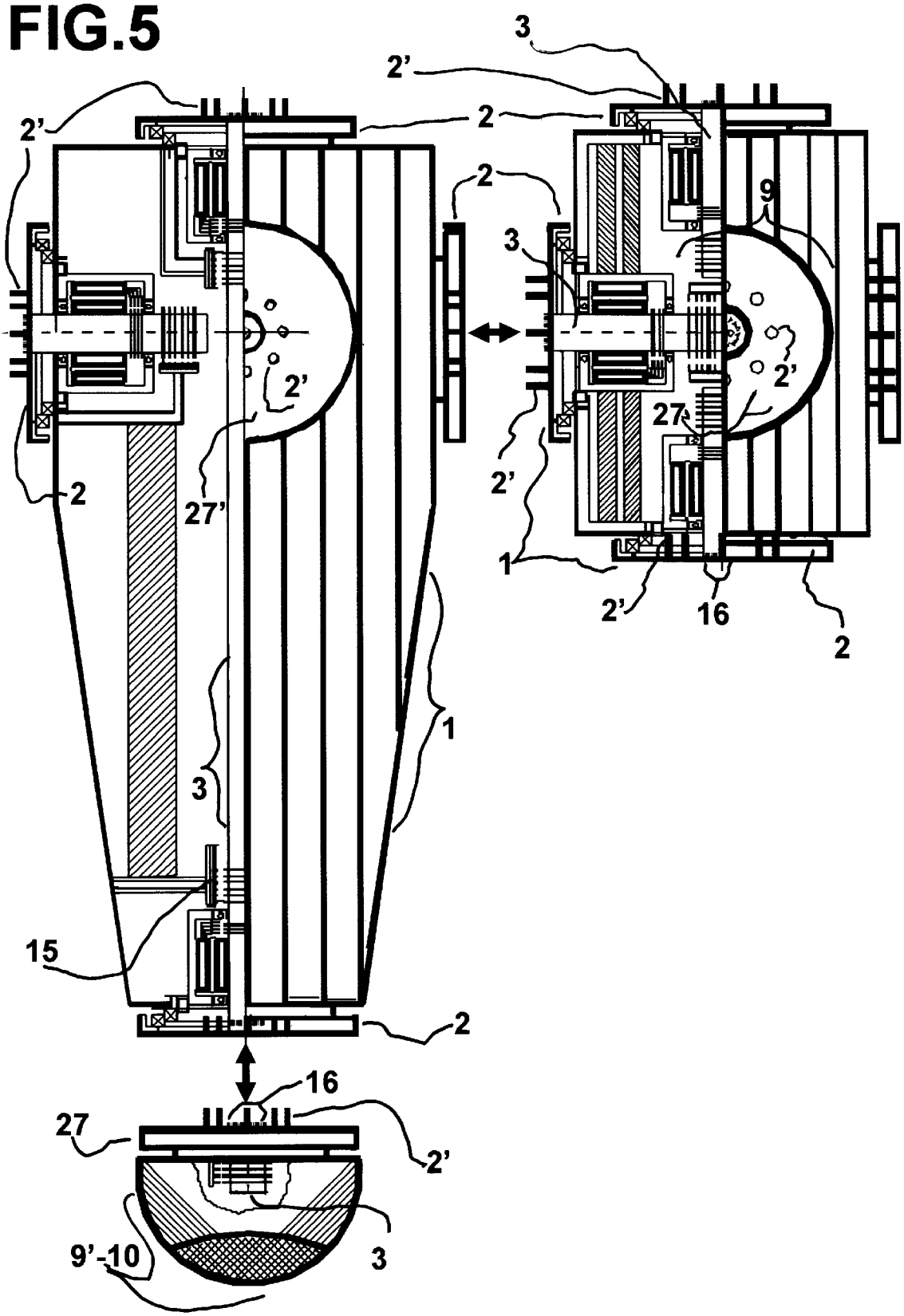
FIG. 5 is a front view of an arms side part of a multiblock robot, partially shown in a sectional view along the center line of the central chamber, before the plug in operation with a socket flange booster chamber in foot position, which is carried out in arrow direction.

Referring to FIG. 5 of the drawings, each of the both multiblocks 1 with different contour are provided with one central chamber 9 of which each has two horizontal and vertical rotation flange plug connection 2 and one, at the front and rear wall located, horizontal socket flanges 27,27' for the reception of socket flange booster chambers with built-in equipment 11. The vertical rotation flange plug connection 2 of the longitudinally extended central chamber 9 located in foot position, receives a socket flange booster chamber 9'-10 which is designed as an image recognition and sensor unit in accordance with the FIG. 4. This socket flange booster chamber 9'-10 is also shown in the state to be plug connected in arrow direction.

Figure 6:
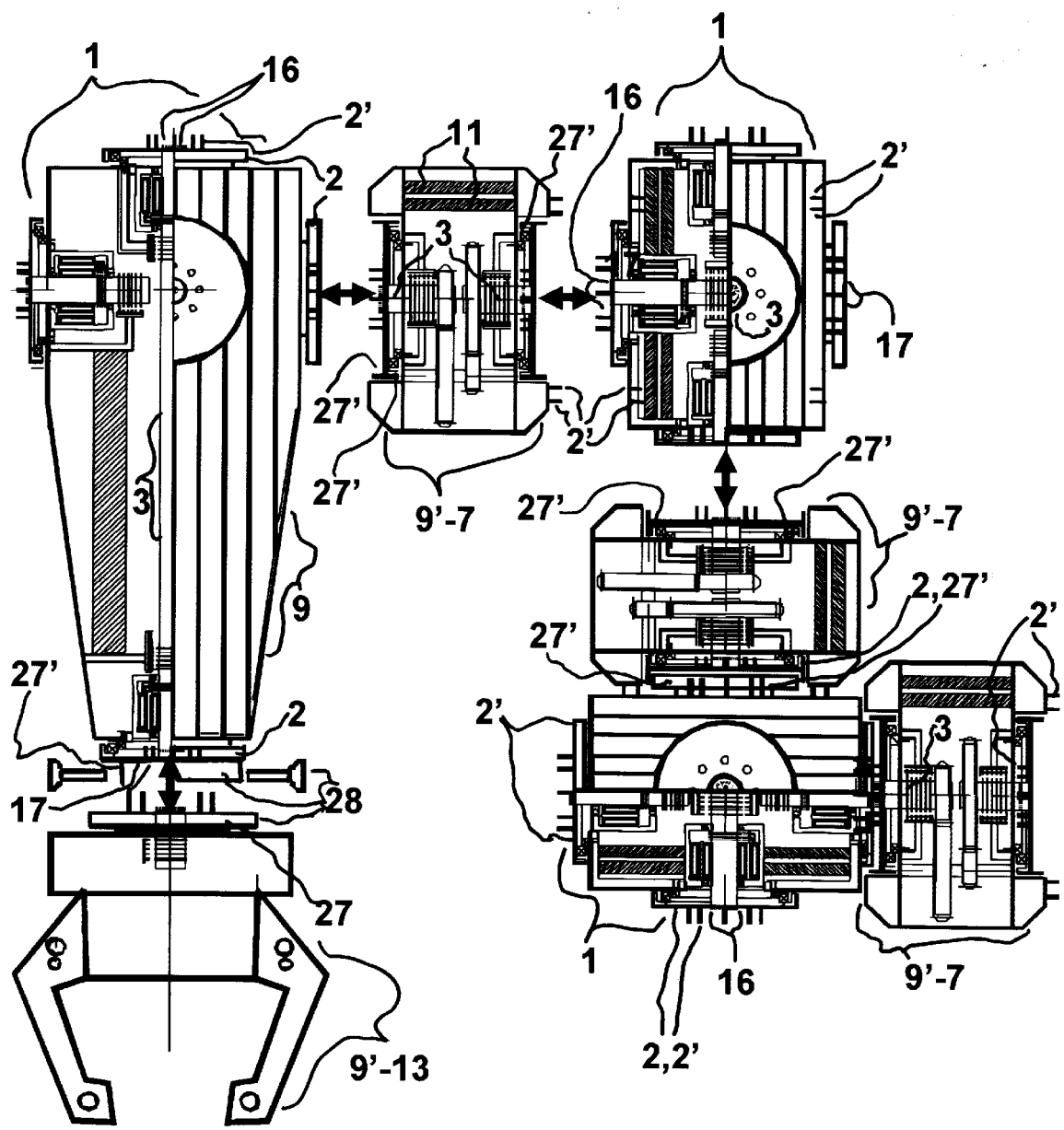
FIG. 6 is a front view of a an upper arm joint of a multiblock robot, consisting of two central chambers partially shown in a sectional view and before the plug in operation which is carried out in arrow direction, with a socket flange booster chamber in foot position and with further socket flange booster chambers already in plug position and shown in a sectional view.

Referring to FIG. 6 of the drawings, between the two central chambers 9 in accordance with the FIG. 5 is provided a socket flange booster chamber 9'-7, which is designed as an electro-mechanical intermediate gear and receives built-in equipment 11 composed of gear parts with electric and electronic control parts. This socket flange booster chamber 9'-7 includes both sided socket flanges 27' which have at the upper side the cavity of a socket flange 27', so that the top edge of this combined flange 27,27' is flush with the outer contour of the socket flange booster chamber 9'-7. The two current and communication channels 3 within the socket flange booster chambers 9'-7 are separated in center position from each other and receive the both sided slip-ring and induction units 10',10",13'13" and the transmission gear pinions. The socket flange booster chamber 9'-7 has a reversed image outer contour, so that it can be plug connected in a 180° angular position, in accordance with the intended transmission direction. The socket flange booster chamber 9'-7 receives at the outer contour one sided engaging plugs 2' which are identically designed as the engaging plugs 2' for the socket flanges 27,27' and the rotation flange plug connections 2. The central chamber 9 comprises at the outer contour the corresponding plug sleeves so that, if plugged together, the socket flange booster chamber 9'-7 and the central chamber 9 are firmly clamped by means of the engaging plugs 2', whereas the socket flange booster chamber 9'-7 is not rotated and remains in rest position against an exerted torque of the central chamber 9, located at the right side. The exerted torque is than transmitted from the socket flange booster chamber 9'-7 through the current and communication channels 3, which have also the function to be a driving and output drive axle, to the rotation flange plug connections 2, located at the opposite side of the central chamber 9. For the outer contour at this regarded side of the socket flange booster chamber 9'-7 are not provided engaging plugs 2' and no rotation preventing connection of the multiblock 1 at the outer contour of the central chamber 9, so that an exerted torque is sensitively transmitted from the multiblock 1, located at the right side to the multiblock 1, located at the left side, or depending on the control impulses, in reversed direction. For the central chamber 9 located in foot position at the left is provided a socket flange booster chamber 9'-13 which is designed as finger gripper, as machining tool with built-in equipment 11 consisting of an electro-mechanical, if necessary a hydraulic drive and of the corresponding control electric and electronic. For a firm and undisplaceable plug connection of this socket flange booster chamber 9'-13 is a horizontal screwed pipe joint 28 provided which is effective in 90° to the rotational axis, this in addition to the otherwise generally provided multiblock robot clamping devices, thus providing a firm plug connection of one chamber to the other. The socket flange booster chamber 9'-13 is provided with a socket flange 27 which has a smaller diameter as the flange of the rotation flange plug connection 2 at the opposite side. The outer flange side in opposite position of the rotation flange plug connection 2 receives here a socket flange 27' with a corresponding inner diameter, so that after the plug in operation, a firm seat is achieved between the socket flange 27 belonging to the socket flange booster chamber 9'-13, and the socket flange 27' of the rotation flange plug connection 2. At the outer edge of the socket flange 27 are provided peripheral throughholes and the outer edge of the socket flange 27' is provided with corresponding threadholes in identical position. After the plug in operation, the clamping bolts are horizontally screwed into the throughholes and the superpositioned threadholes of the socket flange 27 and thus, the seat of both flanges to each other is additionally secured.

Figure 7:
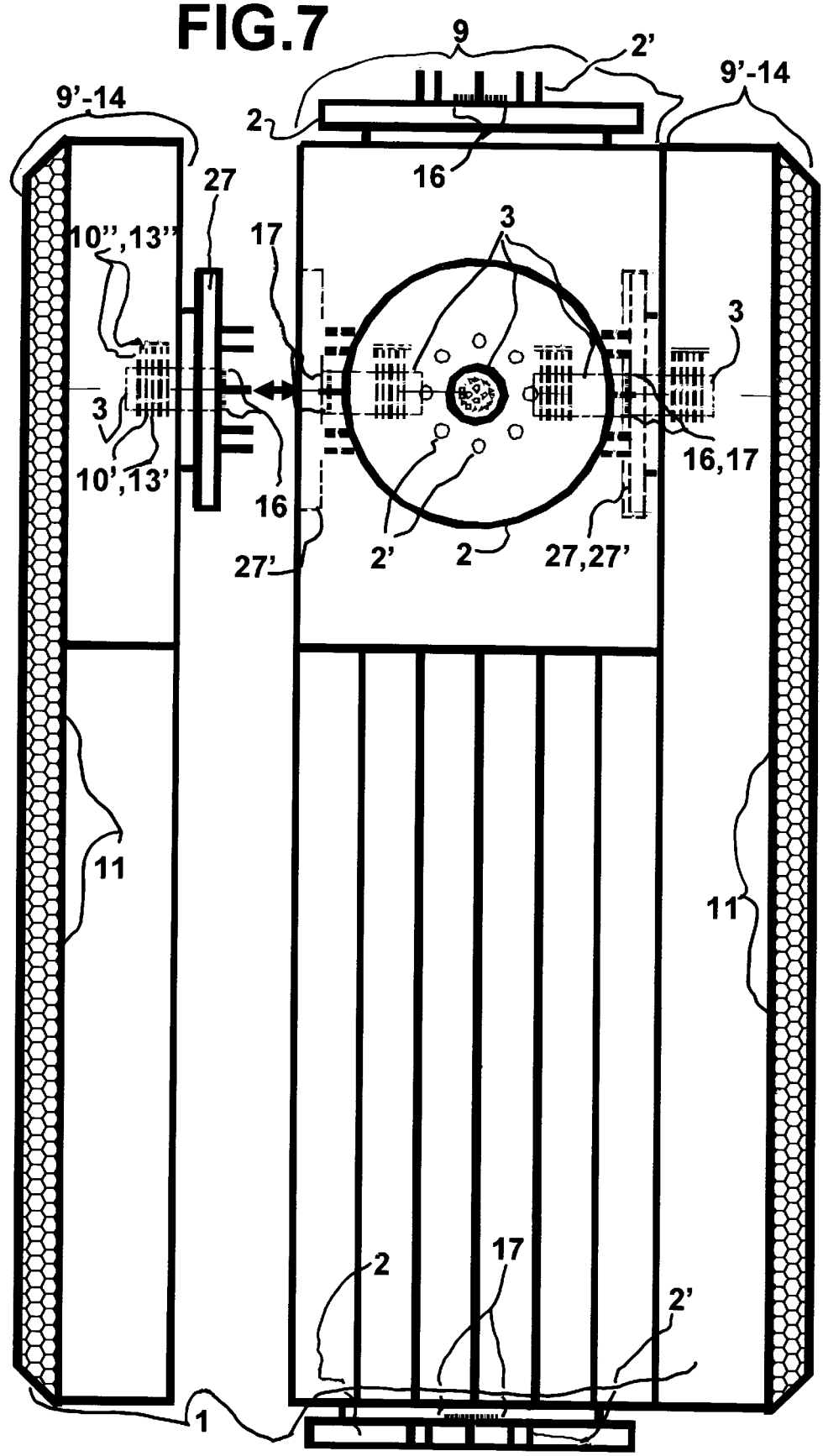
FIG. 7 is a side view of a central chamber shown in FIG. 5 and FIG. 6 of a multiblock with a socket flange booster chamber before the plug in operation in arrow direction has been carried out and in opposite position, the accomplished plug connection of the central chamber with a further socket flange booster chamber.

Referring to FIG. 7 of the drawings, the central chambers 9 of the multiblocks 1 in accordance with the FIG. 5 and FIG. 6 receive at the rear side, socket flange booster chambers 9'-14 which are provided as electric chambers and at the front side, socket flange booster chambers 9' which are provided as electronic chambers. The outer walls of the both sided socket flange booster chambers 9'-14 are composed of solar cells and receive built-in equipment 11 consisting solar collector electronic and complementary electric and electronic components in addition to the built-in equipment 11 within the central chambers 9, for the wiring and control of the driving units, the basic gears and generator units included in the central chambers 9. The socket flange booster chambers of the longitudinally extended multiblocks 1 as also of the short multiblocks 1, are covering with its outer contour precisely and flush, the outer contour and the total surface of the central chambers 9. The socket flange booster chambers 9'-14 and the central chambers 9 are plug connected by means of the socket flanges 27 and the socket flanges 27' and through the cavity seat of both flanges 27,27' they are attached with each other, composing a closed multiblock 1 without an air gap between the socket flange booster chambers 9'-14 and the central chambers 9. The socket flanges 27,27' as also the rotation flange plug connections 2, can be optionally provided horizontally and vertically at the socket flange booster chambers or at the central chambers 9, or separately positioned, or manifold located one beneath the other.

Figure 8:
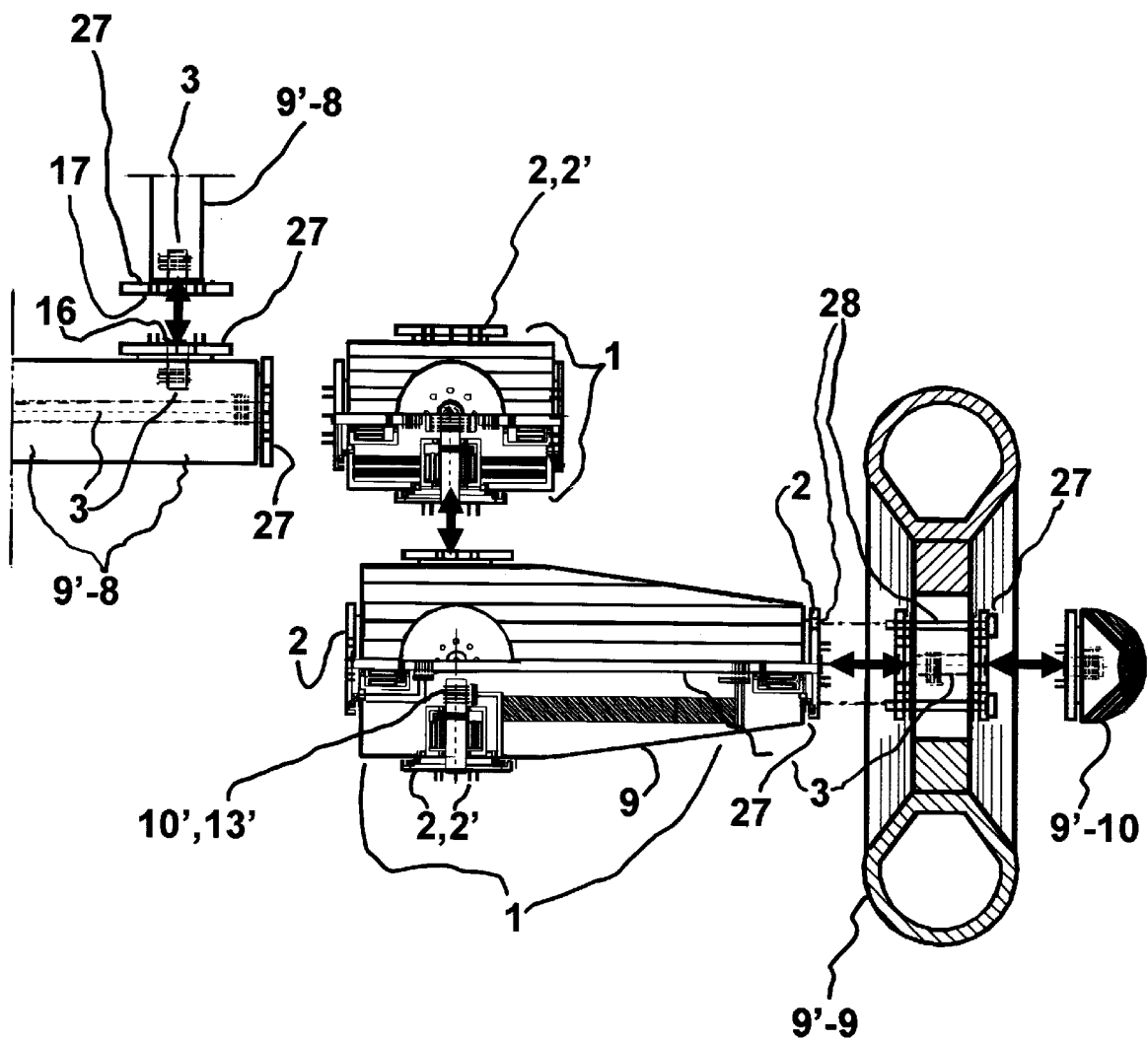
FIG. 8 the front view with a detail of an electro cars driving axle, composed of multiblocks with central chambers, plugged together in arrow direction with socket flange booster chambers.

Referring to FIG. 8 of the drawings, the multiblocks 1 in accordance with the FIGS. 5, 6 and 7 are here provided for the driving axle of an electro car. On the right side is provided a plug connection with a socket flange booster chamber 9'-9 which is designed as a driving wheel with both sided socket flanges 27 and within the wheel hub, with the current and communication channel 3, the slip-ring and induction units 10',10",13'13" and the slip-ring and induction support unit 15 (equally as shown in FIG. 1 ). The central chamber 9 is attached with the socket flange booster chambers 9'-9 by means of the socket flange 27 which is plug connected with the rotation flange plug connection 2. Because of the high rotational forces and stresses, the socket flange booster chamber 9'-9 receives in addition to the plug connection by means of the multiblock robot clamping devices, a vertical screwed pipe joint 28 for the firm and undisplaceable plug connection with the rotation flange plug connection 2. Here is, in contrast to the screwed pipe joint 28 of the FIG. 6, the flange surface of the rotation flange plug connection 2 provided with threadholes, this in direction of the rotational axis, and both socket flanges 27 receive identical throughholes. The screwed pipe joint 28 is than effective by means of the clamping bolts, which are feeded through the throughholes into the position identical threadholes and are tightened in this location. At the outer side of the driving wheel 9'-9 is provided a socket flange booster chamber 9'-10 which is attached to the socket flange 27 and which is designed as image recognition and infrared unit, receiving built-in equipment 11 consisting of image recognition and sensor electronic components. From the upper multiblock 1 to the left, and here from the rotation flange plug connection 2 and the socket flange 27, are provided socket flange booster chambers 9'-8 which compose an electro car baseframe, only consisting of stand-alone socket flange booster chambers 9'-8.

Figure 9:
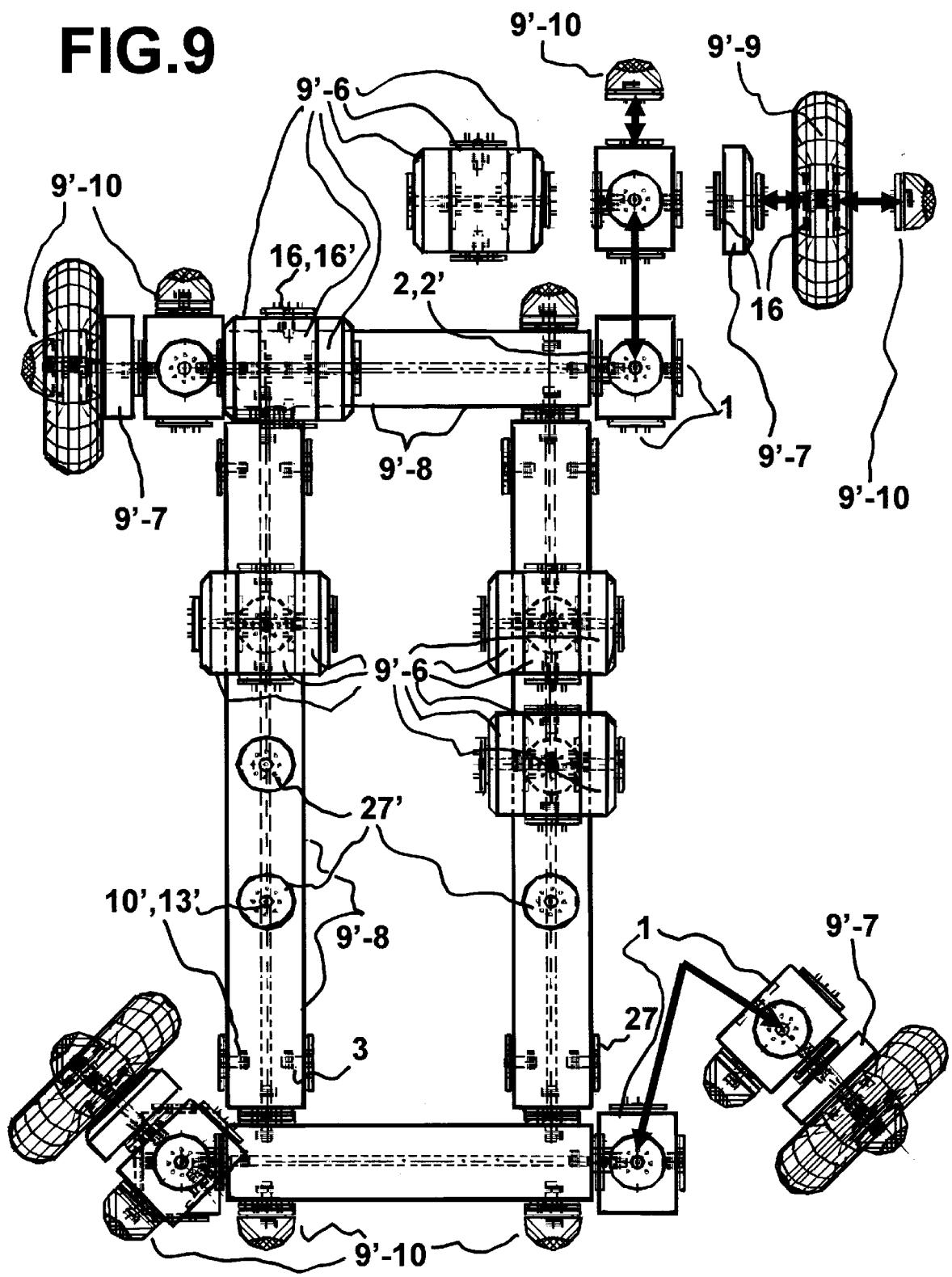
FIG. 9 the plain view of a baseframe with driving axle of an electro car, composed of multiblocks 1 with central chambers 9' and in arrow direction, shown the plug in direction of the driving units, before the plug in operation has been carried out.

Referring to FIG. 9 of the drawings, multiblocks 1 with central chambers 9 (equally as shown in FIG. 8) and socket flange booster chambers attached to multiblocks 1 are combined with stand-alone socket flange booster chambers for the most different multi-axis applications. In the present case, independent, long streched socket flange booster chambers 9'-8 are combined with multiblocks 1 having central chambers 9 and plug connected socket flange booster chambers 9'-8, for the composition of an electro car baseframe to which are attached in dimension fitting standard rasters, socket flanges 27,27' with identical raster dimensions of multiblocks 1, so that multiblocks 1 without or with socket flange booster chambers 9'-8 can be optionally combined and mutually exchanged from raster distance to raster distance of the rotation flange plug connections 2 and of the socket flange booster chambers 9'8. At the four corners of the electro car baseframe are the socket flanges 27 of the stand-alone socket flange booster chambers 9'-8 different to the arrangement shown in FIG. 8, for the purpose of a plug in operation of the right driving axle, here composed of one multiblock 1 which is directly attached with the horizontal rotation flange plug connections 2, without a socket flange booster chamber between. Each of he upper vertical rotation flange plug connection 2 of these multiblocks 1 receives an additional, identical central chamber 9 of one multiblock 1. At the front part of the car baseframe are than the both upper central chambers 9 combined with three socket flange booster chambers, composing one closed multiblock 1. Here is adjoined a central chamber 9, a socket flange booster chamber 9'-7 with both sided attached socket flange 27 and with integrated built-in equipment 11, consisting of an intermediate gear and electric and electronic components for steering, driving and brake energy recovery. Than, in accordance with FIG. 8, is provided a socket flange booster chamber 9'-9 with both sided socket flange 27 that composes a car wheel, and to which is finally plug connected a socket flange booster chamber 9'-10 with one sided socket flange 27, this having built-in equipment 11 for image recognition and with orientation sensors. The both multiblocks 1 at the rear part of the car baseframe are identical with the multiblocks 1 at the front part, but they receive with the horizontal socket flange 27' three battery units, which are combined to one battery socket flange booster chamber 9'-6. In central and rear position of the cars baseframe are provided another four socket flange booster chamber 9'-6 of this battery unit combination.

Furthermore are attached to the socket flanges 27 some more socket flange booster chambers 9'-10 for image recognition and with orientation sensors. The car baseframe composes as such a unit which is composed of independent, stand-alone socket flange booster chambers and of multiblocks 1 with central chambers 9 having socket flange booster chambers, which are laterally plug connected and attached to the socket flanges 27,27' and to the rotation flange plug connection 2 and which are additionally secured with screwed pipe joints 28 at connections and joints with high stress transitions.

This multiblock robot system permits the fast combination and completion with socket flange booster chambers and additional socket flanges 27,27' for the reception of the car body and integration of socket flange booster chambers which are provided with solar cells, with antenna units in accordance with the FIGS. 1, 2, and 4 and of socket flange booster chambers in accordance with FIGS. 1, 2, 3 and 4, consisting of computer and monitor units. For such a multiblock robot electro car, all four wheels with drive, brake recovery, steering and shock absorbing, are individually controlable and adjustable. In correspndance with the self operating multiblock robot principles, all control and adjustment nodes of the car are linked by means of the centrally traversing current and communication channels 3, supplied with current, supervised and controlled. Therefore, the car is provided for a control from the own dashboard, by means of control signals, by means of antenna communication and transmission from external control points, or totally by remote control, as by means of signals from satellites and other remote signal points.

I claim:

1. A robot system with robot specific effects, said robot system comprising:

multiblocks of nearly the same design, each surrounded with one closed chamber for the accommodation of driving units, basic gears, generator units, basic control electronic for said basic units and integrating built-in equipment for overall robot control, combined with multiblocks composed of central chambers and thereof separated socket flange booster chambers, said central chambers, accomodating said driving units, said basic gears, said generator units and said basic control electronic for said basic units, said socket flange booster chambers, with nearly the same contour as said central chambers and integrating said built-in equipment for overall robot control, said central chambers and said socket booster chambers, connecting the current and communication links between said central chambers and said socket flange booster chambers during the operation for plug in connection of said central chambers with said socket flange booster chambers.

2. A robot system as claimed in claim 1 wherein several socket flange booster chambers are arranged as independent stand-alone units one above the other and one beneath the other.

3. A robot system as claimed in claim 1 wherein said central chambers and said socket flange boster chambers comprise:

socket flanges which have the identical contour and are in identical all including identical plug units with engaging plugs and plug sleeve units with plug sleeves, said central chambers and said socket flange booster chambers combined and exchanged with each other and plug connected by means of said socket flanges and said rotation flange plug connections, said rotation flange plug connections and said socket flanges provided with horizontal and vertical screwed pipe joints for undisplaceable, high stress resistent plug connections.

4. A robot system as claimed in claim 3 wherein said socket flange booster chambers and said central chambers with said plug units and said engaging plugs, said plug sleeve units and said plug sleeves comprise:

central current and communication channels which are identical with the current and communication channels of said rotation flange plug connections, including inner and outer slip-ring and induction units, said current and communication channels leading to said plug units and said plug sleeve units each with mains identical plugs and sleeves for the direct link with customary all-mains plugs and sleeves, ready for main circuit connections.

5. A robot system as claimed in claim 1 wherein said multiblock robot built-in equipment for said socket flange booster chambers comprises furthermore:

batteries, solar-cells, sensors, monitors, computer-cpu units, electronic control boards, photo cells, infrared sensors, remote control-antennas and other orientation components and computer peripheral units, as also gears, grippers, machining tools and other components for multi-axis operations, said socket flange booster chambers with said multiblock robot built-in equipment in optional plug combination with said central chambers of said multiblocks for self operating multiblock robot operations, said socket flange booster chambers in optional plug combination with each other, without said central chambers, for the composition of independent, self operating, multiblock robot compatible functional units, as for the composition of stand-alone PC's, control units, battery units, gripper units, car baseframes and multi-axis operational units.

* * * * *